May 25, 1948. W. BROWN 2,441,989
EPICYCLIC VARIABLE SPEED GEARING
Filed May 19, 1944
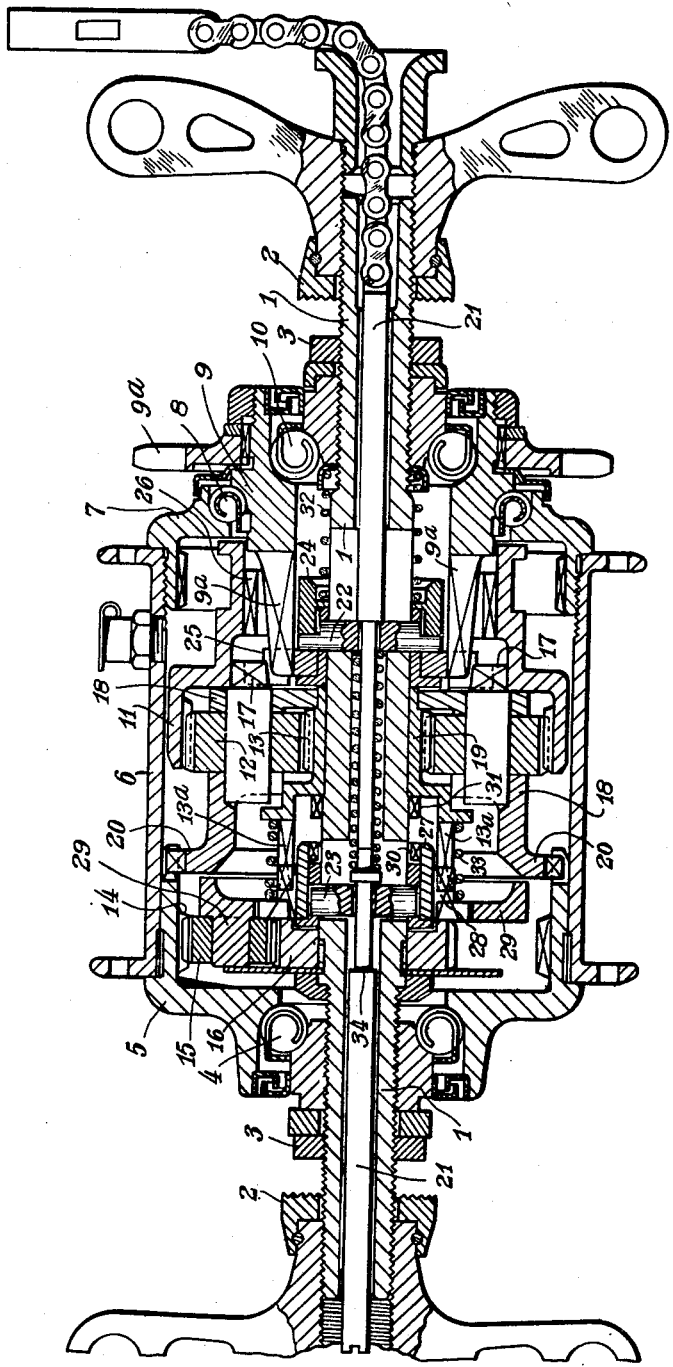
Inventor
William Brown
By
Att'y Patented May 25, 1948

2,441,989

UNITED STATES PATENT OFFICE 2,441,989

EPICYCLIC VARIABLE-SPEED GEARING

William Brown, Nottingham, England, assignor to Sturmey-Archer Gears Limited, Nottingham, England Application May 19, 1944, Serial No. 536,322
In Great Britain February 25, 1943
Section 1, Public Law 690, August 8, 1946
Patent expires February 25, 1963

7 Claims. (Cl. 74—275)

This invention relates to epi-cyclic change-speed gearing and whilst not limited to variable speed hubs for cycles will probably find its principal uses in those hubs. The purpose and advantages of the invention will be gathered from the following introductory discussion of cycle drives.

Drives for pedal cycles may be divided broadly into two classes, namely: (a) fixed or reversible and (b) free or non-reversible. In the latter class, which is by far the larger, it is now a common practice to provide, instead of a single ratio gear, a multi-speed, variable ratio gear and there are numerous constructions of variable-speed gears available, offering individual characteristics and advantages. In particular, multi-speed, non-reversible gears have already been proposed, some of which employ two epi-cyclic trains arranged in cascade (i. e. double coupled) or for more single differential action (i. e. single coupled) and others of which employ compound epi-cyclic trains (i .e. with a common annulus for two or more trains). For example, in a cascade (double coupled) arrangement, the sun wheel and planet cage of one train are connected respectively to the planet cage and annulus of the other train; whilst in a most simple differential (single coupled) arrangement, the only connection between the trains is that the sun wheel of one connects to the planet cage of the other. In a compound train, a plurality of sun wheels (selectively operable), with corresponding plural planet wheels, drive to or are driven from a common annulus. These arrangements, and others not specifically mentioned, provide three, four, five or more speeds in a compact, strongly built light-weighted assembly, and offer a wide variety of ratios including close ratios, and in some cases increases of ratio from normal which are less than the decreases from normal.

On the other hand, the fixed, non-reversible gears, class a referred to above, are usually of a single ratio only, although it has become common to provide a cycle rear wheel with a sprocket at each side, of different diameters, so that a change of ratio can be effected by changing the wheel around in its frame. However, reversible multi-speed drives have been proposed which provided two, and in some cases, three speeds, but in such drives only wide ratio or medium ratio gears were obtainable, unless the overall size of the mechanism was increased unduly. Furthermore, certain constructional drawbacks and weaknesses in those designs of gear can be eliminated by the adoption of the present invention.

The object of the present invention therefore, is to provide fixed (i. e. reversible) multi-speed drives which, as far as closeness of ratio, compactness of build, strength, lightness of weight, ease of gear change, and in some cases number of variations obtainable, offer the advantages provided by the non-reversible drives mentioned above. The invention aims at providing these improved drives not only for cycle wheels, but for other purposes where reversible drives having these advantages are desirable.

Considered generically, a reversible multi-speed gearing according to this invention is characterised by either a cascade (i. e. double coupled) or simple differential (i. e. single-coupled) arrangement of epi-cyclic trains or a compound epicyclic train and by there being a single connection of the drive to the output member, which is a positive connection capable of driving in both directions.

The present invention may be embodied in a gear according to the specifications of United States Patent No. 2,301,852 by omitting one of the alternative ratchet and pawl drives to the output member (say at 17 or 15 in Fig. 1 of that specification) and converting the other to a positive (i. e. reversible drive). By so doing, the total number of speeds obtainable with that gear is reduced slightly, but for those speeds which are obtainable, all the advantages of the earlier constructions are retained and the presence of those advantages in a reversible gear justifies the sacrifice of the speeds not obtainable. If in modifying the construction shown in the said specification, the ratchet drive from the annulus is omitted (i. e. at 17), the speed still obtainable will be "decrease" speeds, whilst on the other hand, if it is the ratchet drive from the planet cage which is omitted (i. e. at 15) the speeds still obtainable will be "increase" speeds.

In the accompanying drawing one example of cycle hub gear embodying the invention is illustrated.

As shown, there is a central hollow, fixed axle or spindle 1 adapted to be held non-rotatably by the clamping members 2 and 3. Upon this shaft, at the left hand end, is a ball-bearing 4 for the end closure member 5 of the hub shell 6, whose other end is carried by the end closure member 7 journalled on the larger ball-bearing 8 disposed around the input member 9, carrying the driving sprocket 9ª, which input member is in turn journalled on the smaller ball-bearing 10 at the right-hand end of the shaft 1. Within the casing 6 are two epi-cyclic trains, which for convenience may be described as "primary" and "secondary." The primary train comprises the annulus 11, the planet pinions 12 and sun wheel 13, whilst the secondary train comprises the annulus 14 formed inside the end closure member 5, the planet pinions 15 and the sun wheel 16 which is permanently keyed to the axle. The annulus 11 is supported on the inner end of the input member 9 and the dogs 17 of the carrier 18 for the pinions 12. Such carrier 18 is supported on larger and smaller parts of a sleeve 19 formed integral with or attached to the sun wheel. Also the carrier 18 has a peripheral flange 20 formed with dog teeth to engage non-removably with further dog teeth on the end of the closure member 5.

Slidable within the hollow shaft 1 is the control rod 21 carrying two keys 22 and 23, the first of which, 22, is connected to a sleeve 24 operating a rotatable selector dog 25 which may engage either the dogs 17 on the planet carrier 18 or splines 26 within the annulus. Such dog 25 is in permanent engagement with the long dogs 9ª on the input member 9. The other key, 23, controls a rotatable sleeve 27, having external dogs 28 to engage permanently with dogs 13ª on the major sun wheel 13 and to have selective engagement with dogs 29 on the carrier for the minor planet pinions 15, and having internal dogs 30 to have selective engagement with dogs 31 on the shaft 1 to be arrested thereby. A spring 32 returns the sleeve 24 to its zero position, whilst a further spring 33 returns the sleeve 27 to its zero position.

Since the member 5 may receive the driving force in both directions, it is splined into the shell 6 instead of being screwed into it, thereby being non-rotatable in the shell.

In use, with the control rod 1 and sleeves 24 and 27 in the position shown, there is a positive drive between the input member 9 and the planet carrier 18 giving a direct drive to the shell 6 through the dogs of flange 20. The annulus 11 rotates at an "increased" speed in a forward direction, but this rotation is idle movement since there is no connection between the annulus 11 and the shell 6. If the selector dog 25 is moved to the right to disengage from the dogs 17 of the planet carrier and engage the splines 26 of the annulus a "decrease" drive is obtained, such decrease being the ratio obtained from both trains using their differential relationship. If now the control member 21 is moved further to the right until the shoulder 34 on the rod 1 moves the key 23, the primary sun wheel 13 is disengaged from the secondary planet carrier 29 and becomes engaged to and arrested by the shaft 1, whereupon a further "decrease" drive is obtained. Meanwhile, the secondary planet carrier 29 idles forward, since there is now no connection between it and the primary sun wheel.

It will be seen that if the dogs 20 were to be omitted, the planet carrier 18 left free from the output member 6, and if the annulus 11 were to be dogged to the output member, e. g. to the end member 7, such member in that case being splined instead of screwed into the hub shell, the same selecting movements of the rod 21 and its keys 22, 23 would give a different sequence of drives, all of which would be reversible.

Contrasting the arrangement shown in the drawing filed herewith with those of the earlier proposals above referred to, the following minor improvements in constructions will appear. The hollow axle is made to a larger diameter, and corresponding alterations have been made in the means for actuating the selector dog 25. The keys 22 and 23 are made as round pins, the former having its ends flattened to engage the sleeve 24. The internal teeth shown on the end closure member 7 are not necessary and may be dispensed with. They are shown only because the standard end closure member from the constructions of the earlier proposals may be used if desired. Again, that part of the annulus which, in the earlier arrangements carried the pawls, is removed so as to lessen the weight.

Since with a reversible gear it is necesary to avoid "backlash" as much as possible, the various dogs are made as close as possible. In particular instead of the main selector member 25 engaging with the projecting ends of the planet pins, in which case the angular displacement between successive engagements would be great, such member engages with the teeth 17 which are formed on the planet carrier itself, and are spaced much closer together.

The improved gears may be used where the drive is received by the outer part 6 and is passed on by the inner part 9, and in any case may be housed in a fixed casing not forming a part of the drive.

What I claim is:

1. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, the planet carrier of said primary train being fixedly coupled to the annulus of said secondary train, said latter annulus constituting the output member, means for selectively keying said input member positively to the planet carrier or to the annulus of said primary train, and means operable while the input member is so keyed to the annulus for selectively keying the sun wheel of said primary train to the planet carrier of said secondary train or to a non-rotating member.

2. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, said primary train being driven by said input member, the planet carrier of said secondary train adapted to be coupled to the sun wheel of said primary train, said output member being permanently coupled to the secondary annulus and to the planet carrier of said primary train, means operable while the input member is so keyed to the annulus for selectively coupling said input member to the planet cage of said primary train or to the annulus thereof, and means for interrupting the coupling between said primary and secondary trains to leave only said primary train in operative position.

3. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, the planet carrier of said primary train being fixedly coupled to the annulus of said secondary train, said latter annulus constituting the output member, means for selectively keying said input member positively to the planet carrier or to the annulus of said primary train, and means operable while the input member is so keyed to the annulus for selectively connecting the sun wheel of said primary train to the planet carrier of said secondary train or to a non-rotating member, said input and output members and trains being co-axial about said spindle.

4. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, the planet carrier of said primary train being fixedly coupled to the annulus of said secondary train, said latter annulus constituting the output member, means for selectively keying said input member positively to the planet carrier or to the annulus of said primary train, and means operable while the input member is so keyed to the annulus for selectively connecting the sun wheel of said primary train either to the planet carrier of said secondary train or to a non-rotating member, said input and output members and trains being co-axial about said spindle, said spindle being hollow, a slidable control member in said spindle, said control member being adapted to connect said input member to the planet carrier or to the annulus of said primary train, and a second sliding control adapted to connect the sun wheel of said primary train to said spindle or to the planet carrier of said secondary train.

5. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, said primary train being driven by said input member, the planet carrier of said secondary train adapted to be coupled to the sun wheel of said primary train, said output member being permanently coupled to the secondary annulus and to the planet carrier of said primary train, means operable while the input member is so keyed to the annulus for selectively coupling said input member to the planet cage of said primary train or to the annulus thereof, and means for interrupting the coupling between said primary and secondary trains to leave only said primary train in operative position, said spindle being hollow, a slidable control member in said spindle, said control being adapted to connect said input member to the planet carrier or to the annulus of the primary train, and a second sliding control adapted to connect the sun wheel of said primary train to said spindle or to the planet carrier of said secondary train.

6. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, the planet carrier of said primary train being fixedly coupled to the annulus of said secondary train, said latter annulus constituting the output member, means for selectively keying said input member positively to said planet carrier or to the annulus of said primary train, and means operable while the input member is so keyed to the annulus for selectively connecting the sun wheel of said primary train to the planet carrier of said secondary train or to a non-rotating member, said input and output members and trains being coaxial about said spindle, said spindle being hollow, a slidable control member in said spindle, said control member being adapted to connect said input member to the planet carrier or to the annulus of the primary train, and a second sliding control adapted to connect the sun wheel of said primary train to said spindle or to the planet carrier of said secondary train, a spring in said spindle biasing said control and adapted to hold said second control in its position for coupling the primary sun wheel and secondary planet carrier together while said first control transfers the connection of said input member from the planet carrier of the primary train to the annulus of the primary train, the connection of said first control with said annulus continuing while the first control makes a further movement with said second control to effect the latter's change of connection of the primary sun wheel from the carrier of the secondary train to said spindle.

7. An epicyclic variable speed gear comprising a spindle, an input member mounted thereon for rotation relative thereto, an output member also mounted on said spindle, side-by-side primary and secondary epicyclic trains on said spindle, each train comprising a sun wheel, a planet carrier with planet wheels and an annulus, the planet carrier of said primary train being fixedly coupled to the annulus of said secondary train, said latter annulus constituting the output member, means for selectively keying said input member positively to said planet carrier or to the annulus of said primary train, and means operable while the input member is so keyed to the annulus for selectively connecting the sun wheel of said primary train to the planet carrier of said secondary train or to a non-rotating member, a cycle wheel hub, said output member being at least a part of said hub, said hub being hollow, and said trains and associated elements being contained within the same.

W. BROWN.

REFERENCES CITED

The following references are of record in the file of this patent:

UNITED STATES PATENTS

| Number | Name | Date |
|---|---|---|
| 2,301,852 | Brown | Nov. 10, 1942 |

FOREIGN PATENTS

| Number | Country | Date |
|---|---|---|
| 63 | Great Britain | Jan. 7, 1907 |
| 519,945 | Great Britain | Apr. 10, 1940 |